United States Patent
Shin et al.

(10) Patent No.: US 12,449,072 B1
(45) Date of Patent: Oct. 21, 2025

(54) PIPE CONNECTION DEVICE

(71) Applicants: COSMOIND CO., LTD, Sejong-si (KR); Young Suk Shin, Sejong-si (KR)

(72) Inventors: Young Suk Shin, Sejong-si (KR); Cheol Ki Min, Cheongju-si (KR); Hong Soon Jang, Hwaseong-si (KR); Sang Pum Nam, Sejong-si (KR); Sun Moon, Sejong-si (KR); Jung Jae Heo, Sejong-si (KR)

(73) Assignees: COSMOIND CO., LTD, Sejong-si (KR); Young Suk Shin, Sejong-si (KR)

( * ) Notice: Subject to any disclaimer, the term of this patent is extended or adjusted under 35 U.S.C. 154(b) by 0 days.

(21) Appl. No.: 18/768,901

(22) Filed: Jul. 10, 2024

(51) Int. Cl.
  *F16L 23/028* (2006.01)
  *F16L 23/024* (2006.01)
  *F16L 23/032* (2006.01)
  *F16L 47/14* (2006.01)

(52) U.S. Cl.
  CPC ......... *F16L 23/0286* (2013.01); *F16L 23/024* (2013.01); *F16L 23/032* (2013.01); *F16L 47/14* (2013.01); *F16L 2201/10* (2013.01)

(58) Field of Classification Search
  CPC ... F16L 23/0286; F16L 23/032; F16L 23/028; F16L 23/024; F16L 23/02; F16L 47/14; F16L 2201/10
  See application file for complete search history.

(56) References Cited

U.S. PATENT DOCUMENTS

| | | | | |
|---|---|---|---|---|
| 2,755,112 A | * | 7/1956 | Adolph, V | F16L 23/024 |
| 3,498,643 A | * | 3/1970 | Reiss | F16L 23/0286 |
| 3,652,110 A | * | 3/1972 | Manton | F16L 23/0286 |
| 4,458,924 A | * | 7/1984 | Schlicht | F16L 23/032 |
| 4,991,881 A | * | 2/1991 | Davis | F16L 23/0286 |
| 5,163,712 A | * | 11/1992 | Sabo | F16L 23/0286 |
| 10,393,297 B2 | * | 8/2019 | Lee | F16L 23/02 |
| 2022/0163146 A1 | * | 5/2022 | Aptiogullari | |

FOREIGN PATENT DOCUMENTS

| | | | | |
|---|---|---|---|---|
| KR | 10-1547135 B1 | | 8/2015 | |
| KR | 2017002668 U | * | 7/2017 | F16L 23/02 |
| KR | 2021017530 A | * | 2/2021 | |
| WO | WO-2012165869 A2 | * | 12/2012 | F16L 23/028 |

OTHER PUBLICATIONS

WO-2012165869-A2—Machine Translation—English (Year: 2012).*
KR-2017002668-U—Machine Translation—English (Year: 2017).*
KR-2021017530-A—Machine Translation—English (Year: 2021).*

* cited by examiner

*Primary Examiner* — William S. Choi
(74) *Attorney, Agent, or Firm* — Rabin & Berdo, P.C.

(57) ABSTRACT

Provided is a pipe connection device. The pipe connection device includes an adapter including a hollow pipe and a ring-shaped protruding end extending in the diameter direction of the hollow pipe from one end of the hollow pipe in the longitudinal direction, a ring flange formed in a ring shape and mounted so as to surround the outer circumferential surface of the protruding end and to be axially rotatable about a central axis of the hollow pipe in the longitudinal direction but not to be movable in the longitudinal direction of the hollow pipe, and a fastening unit configured to join two different ring flanges to each other in a stacked structure so that one end of one of two different hollow pipes in the longitudinal direction and one end of the remaining one of the two different hollow pipes in the longitudinal direction are forcibly secured to each other.

6 Claims, 9 Drawing Sheets

PIPE CONNECTION DEVICE

BACKGROUND OF THE INVENTION

Field of the Invention

The present invention relates to a device for connecting different pipes to each other in series by joining two flanges to each other in a stacked structure, and more particularly, to a pipe connection device configured such that a flange is mounted in a rotatable structure so that a fastening unit for joining of two flanges is easily mounted.

Description of the Related Art

In general, a piping system is used for conveyance of fluid in various facilities, e.g., household facilities and industrial facilities in industrial sites. Such a piping system is constituted by a plurality of pipes interconnecting a fluid source and a fluid-using part.

A plurality of pipes constituting a piping system is continuously connected to one another by various pipe connection devices. In some cases, various valves for control of the flow of fluid are mounted between pipes. In actual plumbing construction sites, pipes having certain lengths are sequentially laid underground or installed on the ground. In this case, all the pipes are connected to one another by pipe connection devices to form a piping system.

A wide variety of pipe connection devices has been developed and supplied, one of which is a flange. A flange is a ring-shaped part welded to a pipe in order to connect pipes in a longitudinal direction. Flanges of pipes are tightly joined to each other by means of a plurality of bolts and nuts with ends of the pipes aligned with each other.

The flange is a ring-shaped member having a plurality of bolt holes formed therein and is welded and fixed to an outer circumferential surface of an end of a pipe. In the state in which flanges of pipes to be connected are in close contact with each other, bolts are inserted through bolt holes in the flanges and then nuts are fastened on the other end, thereby completing connection of the pipes.

However, because the general flange described above is completely welded and fixed to a pipe, there is inconvenience that it is not easy to align opposing flanges with each other. That is, it is surprisingly difficult and very cumbersome to align bolt holes in opposing flanges in a straight line.

For example, in order to align the bolt holes in a straight line, it is necessary to lift one of opposing pipes and then to axially rotate the same little by little to the left and right. However, lifting a heavy pipe is very difficult and requires equipment and manpower.

As an example for solving this problem, Korean Patent Registration No. 10-1547135 discloses a flange device for connecting pipes in which a flange is rotatably provided. However, this conventional flange device for connecting pipes necessarily requires a separate stopper for restricting movement of a rotary flange in order to prevent the rotary flange from moving in the longitudinal direction of the pipe, and thus has disadvantages in that the structure thereof is complicated and construction using the same is time-consuming.

In addition, when connecting two pipes using the above conventional flange device for connecting pipes, a rotary flange and a fixed flange are joined to each other in a simply stacked structure, which may cause leakage of fluid therebetween. Further, if the rotary flange is manufactured such that the thickness thereof is even slightly greater than a design value, a gap may be created between ends of the two pipes. Furthermore, if the rotary flange and the fixed flange are repeatedly joined to and released from each other, portions to which a pressing force is applied may be worn, and thus airtightness may deteriorate.

RELATED ART DOCUMENT

Patent Document (Patent Document 0001) KR 10-1547135 B1

SUMMARY OF THE INVENTION

The present invention has been made to solve the above problems, and it is an object of the present invention to provide a pipe connection device capable of more easily and stably connecting two pipes to each other, preventing a rotary flange from moving in the longitudinal direction of the pipe without using a separate stopper, improving sealability between the two pipes, and preventing deterioration in airtightness when the two pipes are repeatedly joined to and released from each other multiple times.

The objects to be accomplished by the invention are not limited to the above-mentioned object, and other objects not mentioned herein will be clearly understood by those skilled in the art from the following description.

In accordance with an aspect of the present invention, the above and other objects can be accomplished by the provision of a pipe connection device including an adapter including a hollow pipe and a ring-shaped protruding end extending in the diameter direction of the hollow pipe from one end of the hollow pipe in the longitudinal direction, a ring flange formed in a ring shape and mounted so as to surround the outer circumferential surface of the protruding end and to be axially rotatable about a central axis of the hollow pipe in the longitudinal direction but not to be movable in the longitudinal direction of the hollow pipe, and a fastening unit configured to join two different ring flanges to each other in a stacked structure so that one end of one of two different hollow pipes in the longitudinal direction and one end of the remaining one of the two different hollow pipes in the longitudinal direction are forcibly secured to each other.

The protruding end may include at least one seating groove formed in a circular shape in one surface thereof so as to surround an inner space in the hollow pipe, and the pipe connection device may further include an O-ring seated in the seating groove.

A surface of the protruding end forming one plane together with one end of the hollow pipe in the longitudinal direction may protrude a preset distance beyond one surface of the ring flange.

The protruding end may include a slide groove formed in an outer circumferential surface thereof so as to extend in the circumferential direction of the protruding end, and the ring flange may include a slide protrusion formed on an inner circumferential surface thereof so as to be inserted into the slide groove and to be slidable in the longitudinal direction of the slide groove.

An end surface of the slide protrusion may be formed to be inclined in a direction intersecting the bottom surface of the slide groove so that an end of the slide protrusion is in line contact with the bottom surface of the slide groove.

An inner wall of the slide groove close to one end of the hollow pipe among the inner walls of the slide groove may be formed to be higher than an inner wall thereof close to the other end of the hollow pipe.

The inner wall of the slide groove close to one end of the hollow pipe among the inner walls of the slide groove may be formed to be inclined toward one end of the hollow pipe from the top of the slide groove to the bottom surface of the slide groove, and one side surface of the slide protrusion may be formed to be inclined so as to be in contact with the inclined inner wall of the slide groove.

The pipe connection device may further include a groove reinforcing plate having higher strength and wear resistance than the protruding end and attached to the inner wall of the slide groove close to one end of the hollow pipe among the inner walls of the slide groove and a protrusion reinforcing plate having higher strength and wear resistance than the slide protrusion and attached to an outer surface of the slide protrusion corresponding to the groove reinforcing plate among the outer surfaces of the slide protrusion.

The ring flange may include a plurality of fastening holes formed therein, and the fastening unit may include a fastening bolt inserted through fastening holes in two ring flanges disposed in a stacked structure and a fastening nut configured to secure the fastening bolt to the ring flange.

The plurality of fastening holes may be arranged at regular intervals in the circumferential direction of the ring flange. The ring flange may further include click protrusions protruding from one surface of the ring flange to a preset height or less and click grooves formed in one surface of the ring flange so as to receive the click protrusions. The click protrusions and the click grooves may be alternately arranged such that one of the click protrusions or one of the click grooves is located between two adjacent ones of the plurality of fastening holes.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
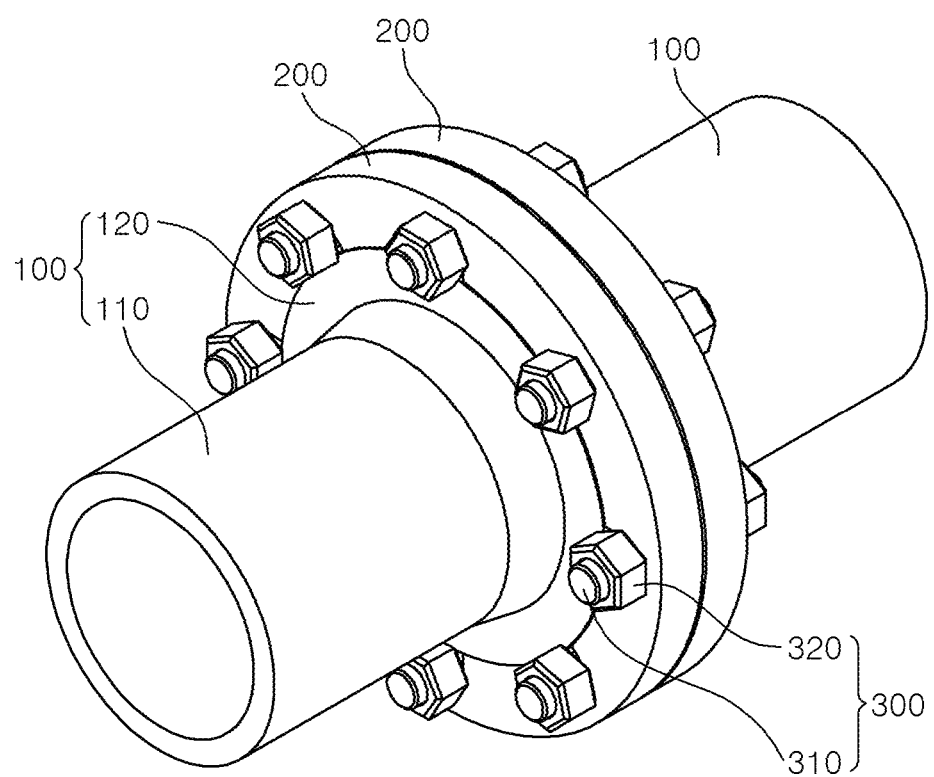
FIG. 1 is a view showing a use state of a pipe connection device according to the present invention.

Hereinafter, embodiments of the present invention will be described in detail with reference to the accompanying drawings so that those skilled in the art to which the present invention pertains may easily carry out the embodiments. The present invention may, however, be embodied in many different forms, and should not be construed as being limited to the embodiments set forth herein.

In the drawings, the sizes or shapes of components may be exaggerated or schematically illustrated for clarity and convenience of description.

Also, the terms used in the following description are terms defined taking into consideration the functions obtained in accordance with the present invention, and may be changed in accordance with the option of a user or operator or a usual practice. Therefore, the definitions of these terms should be determined based on the total content of this specification.

A description of parts unrelated to the technical spirit of the present invention is omitted in order to clearly and briefly describe the present invention, and the same or extremely similar components are denoted by the same reference numerals throughout the specification.

In addition, in several exemplary embodiments, components having the same configuration will be representatively described using the same reference numerals in an exemplary embodiment, and only components different from those of an exemplary embodiment will be described in the other exemplary embodiments.

Throughout the specification, when an element is said to be "connected", "coupled", or "joined" to another element, the element and the other element may be "directly connected", "directly coupled", or "directly joined" to each other, or may be "indirectly connected", "indirectly coupled", or "indirectly joined" to each other with one or more intervening elements interposed therebetween. In addition, throughout the specification, when an element is referred to as "comprising", "including", or "having" another element, the element should not be understood as excluding other elements, so long as there is no special conflicting description, and the element may include at least one other element.

Figure 2:
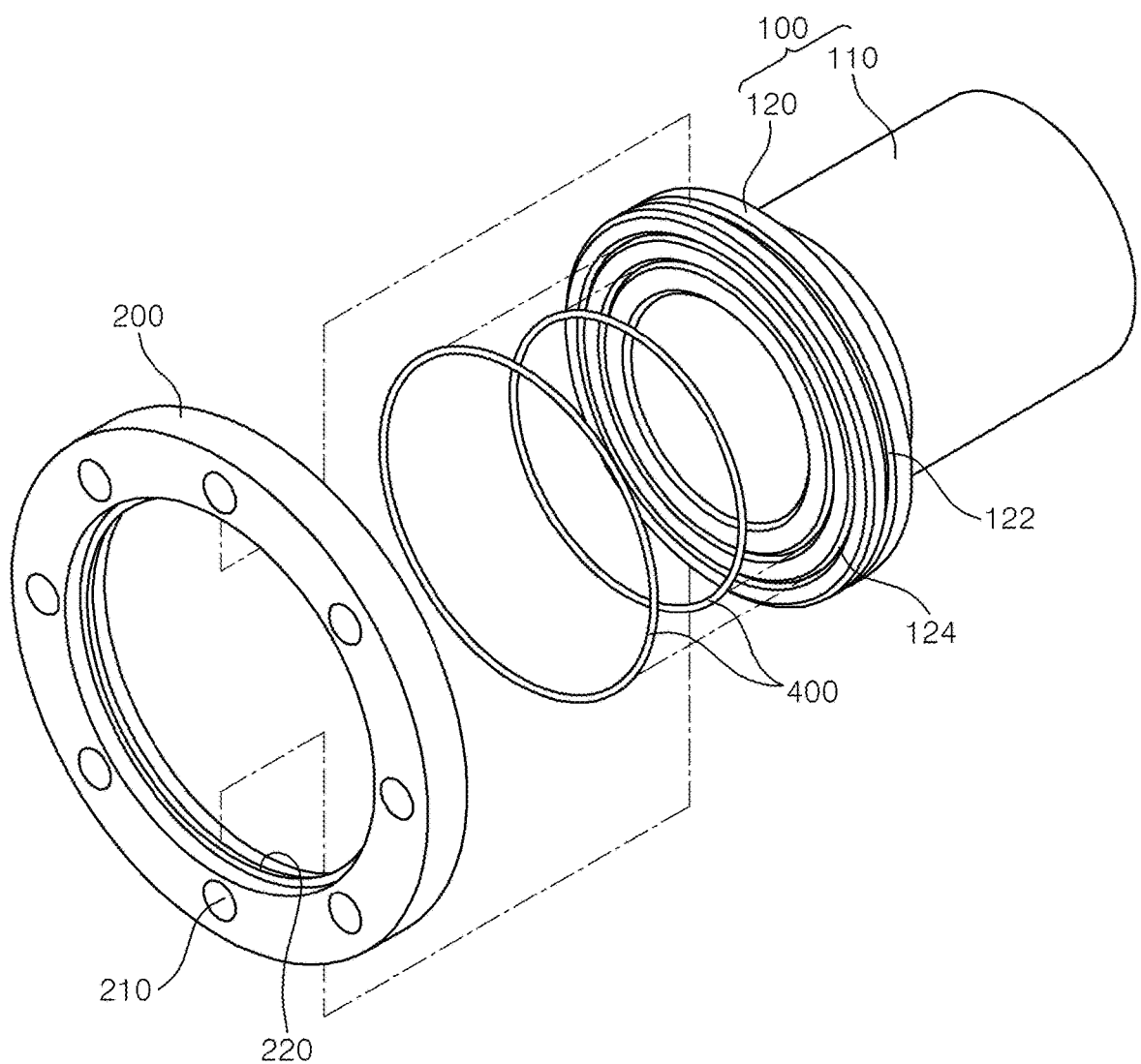
FIGS. 2 and 3 are, respectively, an exploded perspective view and a cross-sectional view of the pipe connection device according to the present invention.
Figure 3:
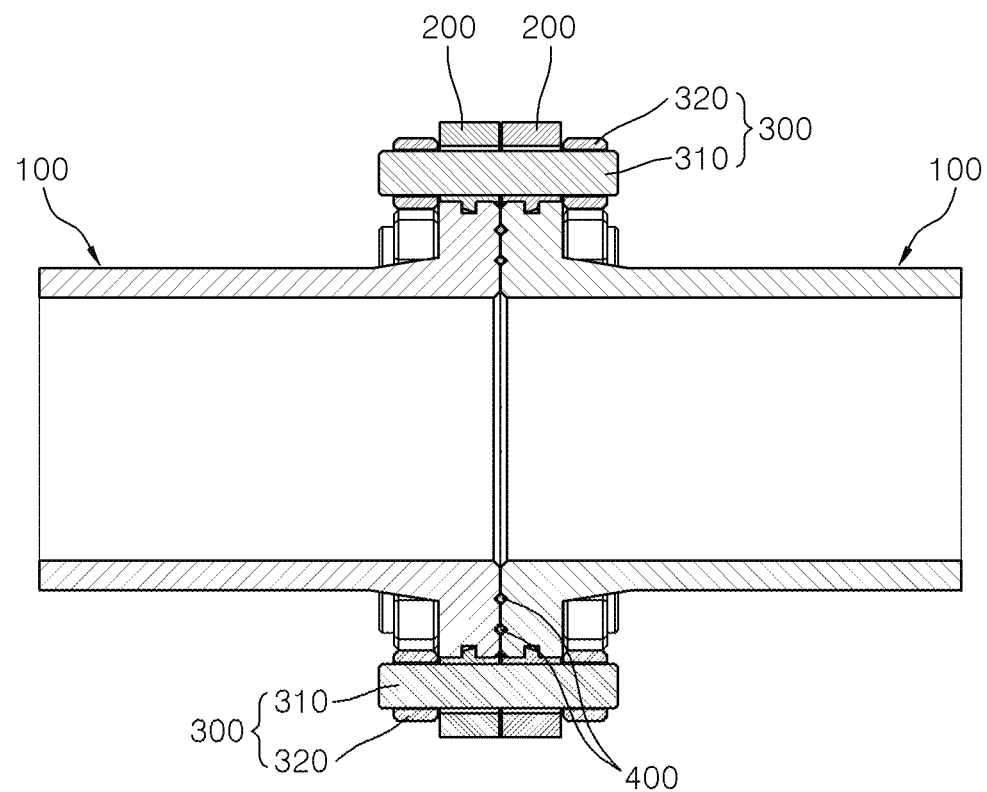
Figure 4:
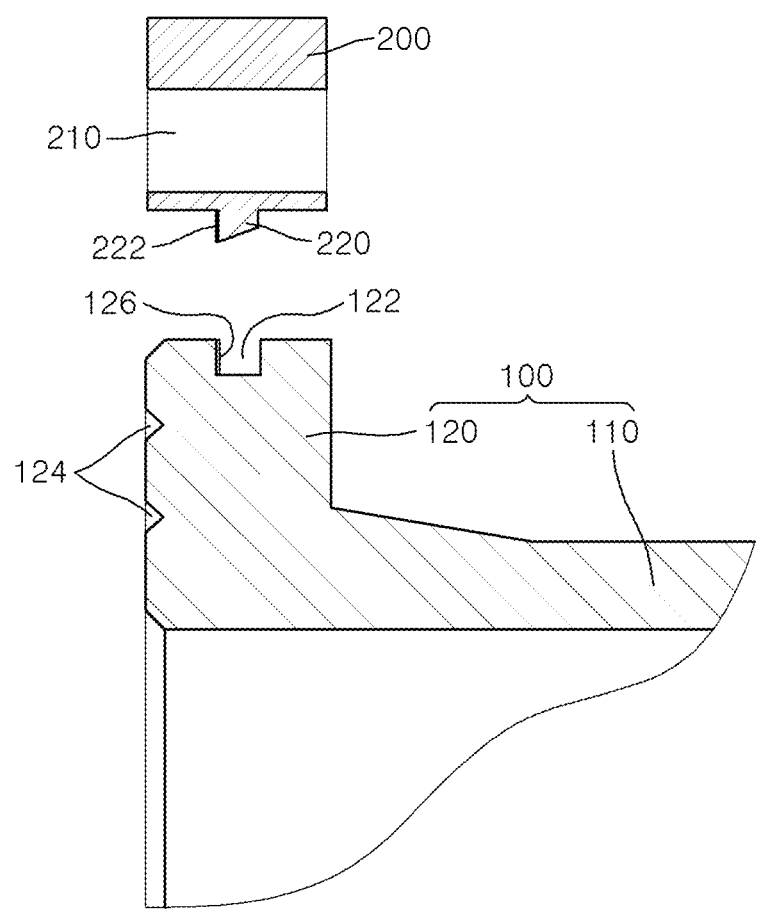
FIGS. 4 and 5 are, respectively, an exploded cross-sectional view and a perspective view showing a coupling structure between an adapter and a ring flange.
Figure 5:
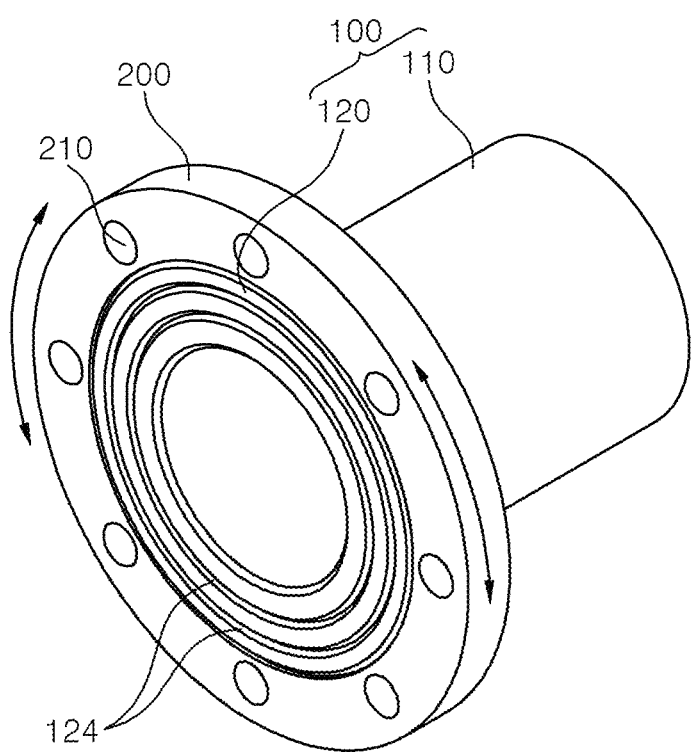

FIG. 1 is a view showing a use state of a pipe connection device according to the present invention. FIGS. 2 and 3 are, respectively, an exploded perspective view and a cross-sectional view of the pipe connection device according to the present invention. FIGS. 4 and 5 are, respectively, an exploded cross-sectional view and a perspective view showing a coupling structure between an adapter and a ring flange.

The pipe connection device according to the present invention is a device for airtightly joining two different pipes to each other in a flange connection manner, and includes an adapter 100 including a hollow pipe 110 and a protruding end 120, a ring flange 200 coupled to the adapter 100 in an axially rotatable structure, and a fastening unit 300 configured to join two different ring flanges 200 to each other in a stacked structure, i.e., in a butted manner, to airtightly connect two hollow pipes 110 to each other. The protruding end 120 extends in the diameter direction of the hollow pipe 110 from an end of the hollow pipe 110 in the longitudinal direction. The ring flange 200 is mounted so as to surround the outer circumferential surface of the protruding end 120 and to be axially rotatable about the central axis of the hollow pipe 110 in the longitudinal direction but not to be movable in the longitudinal direction of the hollow pipe 110.

A user joins a pipe (not shown) to the other side of the hollow pipe 110 (specifically, the side opposite the ring flange 200) and then, as shown in FIG. 1, joins flanges included in different pipe connection devices to each other in a stacked manner, thereby allowing two pipes to communicate with each other.

The ring flange 200 includes a plurality of fastening holes 210 formed therein to allow the fastening unit 300 to be fastened thereto. The fastening unit 300 includes a fastening bolt 310 inserted through a corresponding one of the fastening holes 210 and a fastening nut 320 configured to secure the fastening bolt 310 to the ring flange 200. Thus, as shown in FIG. 1, in order to insert the fastening bolt 310 through the two ring flanges 200 disposed in a stacked structure, the ring flanges 200 need to be rotated so that the fastening holes 210 formed in one of the ring flanges 200 and the fastening holes 210 formed in the other of the ring flanges 200 are aligned with each other. If the ring flange 200 is fixedly coupled to the adapter 100, when it is intended to adjust the positions of the fastening holes 210 formed in the ring flange 200, there is a problem in that it is very difficult to adjust the positions of the fastening holes 210 because the entirety of the pipe connection device of the present invention needs to be rotated. Particularly, if the pipe is in a state of being coupled to the other side of the hollow pipe 110, it is almost impossible to rotate the pipe connection device of the present invention.

In contrast, the ring flange 200 according to the present invention is coupled to the protruding end 120 of the adapter 100 in an axially rotatable structure rather than being fixedly coupled to the adapter 100. Thus, a worker may easily align the fastening holes 210 formed in the two ring flanges 200 with each other while rotating the ring flanges 200, and may join the two ring flanges 200 in a stacked structure through insertion of the fastening bolt 310 and engagement of the fastening nut 320. When the two ring flanges 200 are joined to each other in a stacked structure in this way, one end of one of the two different hollow pipes 110, to which a corresponding one of the ring flanges 200 is mounted, and one end of the other hollow pipe 110 are forcibly secured to each other, and accordingly, the pipes coupled to the other ends of the respective hollow pipes 110 integrally communicate with each other through the hollow pipes 110.

In addition, when the two ring flanges 200 are joined to each other in a stacked structure, the protruding ends 120 formed at the respective hollow pipes 110 are also brought into close contact with each other. At least one O-ring 400 is provided between the two protruding ends 120 in order to prevent fluid flowing through the hollow pipes 110 from leaking between the two protruding ends 120 in close contact with each other. In this case, in order to allow the O-ring 400 to be accurately secured at a preset position, at least one seating groove 124 is formed in a circular shape in one surface of each of the protruding ends 120 so as to surround an inner space in a corresponding one of the hollow pipes 110. The O-ring 400 is seated in the seating groove 124.

If one surface of the ring flange 200 (specifically, a surface of the protruding end forming one plane together with one end of the hollow pipe 110 in the longitudinal direction) and one end of the protruding end 120 in the longitudinal direction are formed so as to form one plane together when the ring flange 200 is mounted so as to surround the protruding end 120, when the two ring flanges 200 are joined to each other in a stacked structure, one surface of one of the two protruding ends 120 mounted to the respective ring flanges 200 and one surface of the other protruding end 120 are also brought into close contact with each other, as shown in FIG. 3. However, if the ring flange 200 is manufactured such that the thickness thereof is even slightly greater than a design value or if the protruding end 120 is manufactured such that the thickness thereof is even slightly less than a design value, the two protruding ends 120 may not be brought into close contact with each other when the two ring flanges 200 are joined so as to be forcibly secured to each other.

Therefore, it is preferable that one surface of the protruding end 120 be formed to protrude a preset distance beyond one surface of the ring flange 200. When the protruding end 120 is formed to protrude slightly beyond the ring flange 200, even if the thickness of the ring flange 200 is formed to be slightly greater than a design value or even if the thickness of the protruding end 120 is formed to be slightly less than a design value, the two protruding ends may be forcibly secured to each other when the two ring flanges 200 are joined to each other in a stacked structure.

In addition, in order to allow the ring flange 200 to axially rotate about the central axis of the hollow pipe 110 in the longitudinal direction but to prevent the ring flange 200 from moving in the longitudinal direction of the hollow pipe 110, the protruding end 120 includes a slide groove 122 formed in the outer circumferential surface thereof so as to extend in the circumferential direction of the protruding end 120, and the ring flange 200 includes a slide protrusion 220 formed on the inner circumferential surface thereof so as to be inserted into the slide groove 122 and to be slidable in the longitudinal direction of the slide groove 122.

When the slide protrusion 220 of the ring flange 200 is formed so as to be inserted into the slide groove 122 in the protruding end 120 in this way, the ring flange 200 is prevented from escaping from the adapter 100 unless the slide protrusion 220 is broken. Thus, when connecting two pipes to each other using the pipe connection device of the present invention, a worker does not need to separately carry the adapter 100 and the ring flange 200 or to perform a task of fitting the ring flange 200 to the adapter 100, thereby more rapidly and easily achieving connection of the pipes.

In this case, if the end surface of the slide protrusion 220 is formed to make surface contact with the bottom surface of the slide groove 122, a large frictional force is generated when the ring flange 200 is axially rotated, and thus it may be very labor intensive to align the fastening holes 210 while axially rotating the ring flange 200. Particularly, if the ring flange 200 is made of metal and thus has a high weight or a large size, it may be very difficult to axially rotate the ring flange 200.

In order to solve this problem, according to the pipe connection device of the present invention, it is preferable for the end surface of the slide protrusion 220 to be formed to be inclined in a direction intersecting the bottom surface of the slide groove 122. As shown in FIG. 4, when the end surface of the slide protrusion 220 is formed to be inclined, the end of the slide protrusion 220 is in line contact with the bottom surface of the slide groove 122 rather than being in surface contact therewith. Accordingly, the frictional force between the slide protrusion 220 and the slide groove 122 may be greatly reduced. As a result, the worker may more easily rotate the ring flange 200.

In addition, as shown in FIG. 3, when the fastening nut 320 is tightened so that the two ring flanges 200 are joined to each other in a stacked structure, the slide protrusion 220 presses an inner wall of the slide groove 122 (specifically, an inner wall close to one end of the hollow pipe 110) due to a fastening force between the fastening bolt 310 and the fastening nut 320, whereby the two opposing protruding ends 120 are forcibly secured to each other.

In this case, if the fastening force for tightening the fastening nut 320 on the fastening bolt 310 is strong and thus the slide protrusion 220 strongly presses the inner wall of the slide groove 122, a contact surface between the outer surface of the slide protrusion 220 and the inner wall of the slide groove 122 may be deformed or damaged. If the slide protrusion 220 or the slide groove 122 is deformed or damaged, when the two stacked ring flanges 200 are tightly joined to each other, the two protruding ends 120 may not be firmly secured to each other. Particularly, if the adapter 100 and the ring flange 200 are made of a synthetic resin in order to hot bond the pipe made of a synthetic resin, the risk of the slide protrusion 220 or the slide groove 122 being deformed or damaged further increases.

Therefore, according to the pipe connection device of the present invention, in order to prevent the slide protrusion 220 or the slide groove 122 from being deformed or damaged, as shown in FIG. 4, a groove reinforcing plate 126 having higher strength and wear resistance than the protruding end 120 is preferably attached to the inner wall of the slide groove 122 close to one end of the hollow pipe 110 (left inner wall in FIG. 4) among the inner walls of the slide groove 122, and a protrusion reinforcing plate 222 having higher strength and wear resistance than the slide protrusion 220 is preferably attached to the outer surface of the slide protrusion 220 corresponding to the groove reinforcing plate 126 (left outer surface in FIG. 4) among the outer surfaces of the slide protrusion 220.

When the slide groove 122 and the slide protrusion 220 are provided with the groove reinforcing plate 126 and the protrusion reinforcing plate 222 in this way, even if the adapter 100 and the ring flange 200 are made of a synthetic resin, the risk of the slide protrusion 220 or the slide groove 122 being deformed or damaged may be greatly reduced. In this case, the groove reinforcing plate 126 and the protrusion reinforcing plate 222 may be made of any of various materials, so long as the material has strength that prevents the groove reinforcing plate 126 and the protrusion reinforcing plate 222 from being deformed or damaged due to the fastening force of the fastening unit 300.

Figure 6:
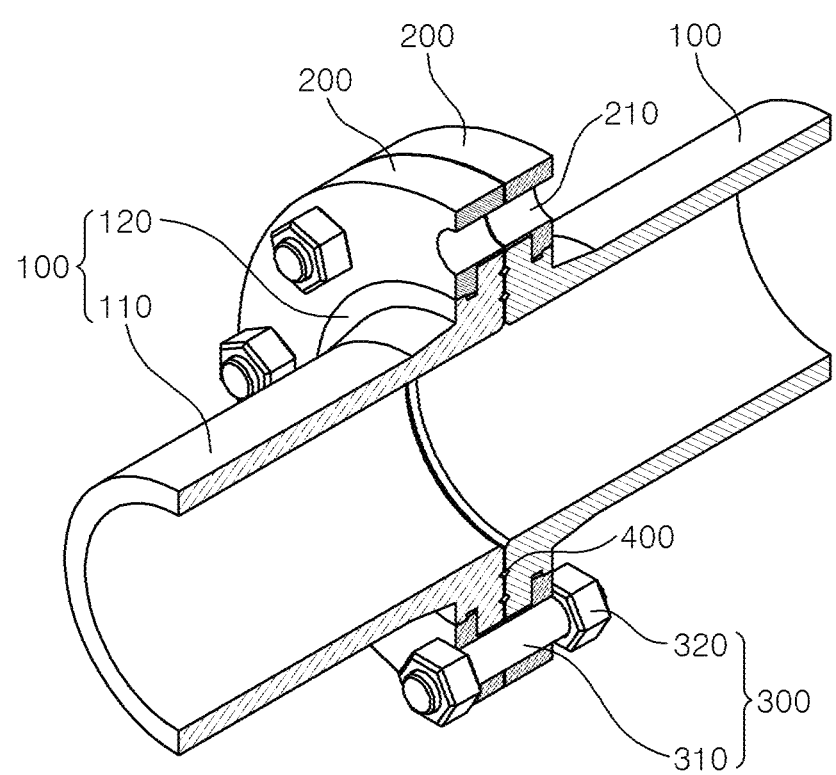
FIGS. 6 and 7 are, respectively, a perspective cross-sectional view and an exploded cross-sectional view of a second embodiment of the pipe connection device according to the present invention.
Figure 7:
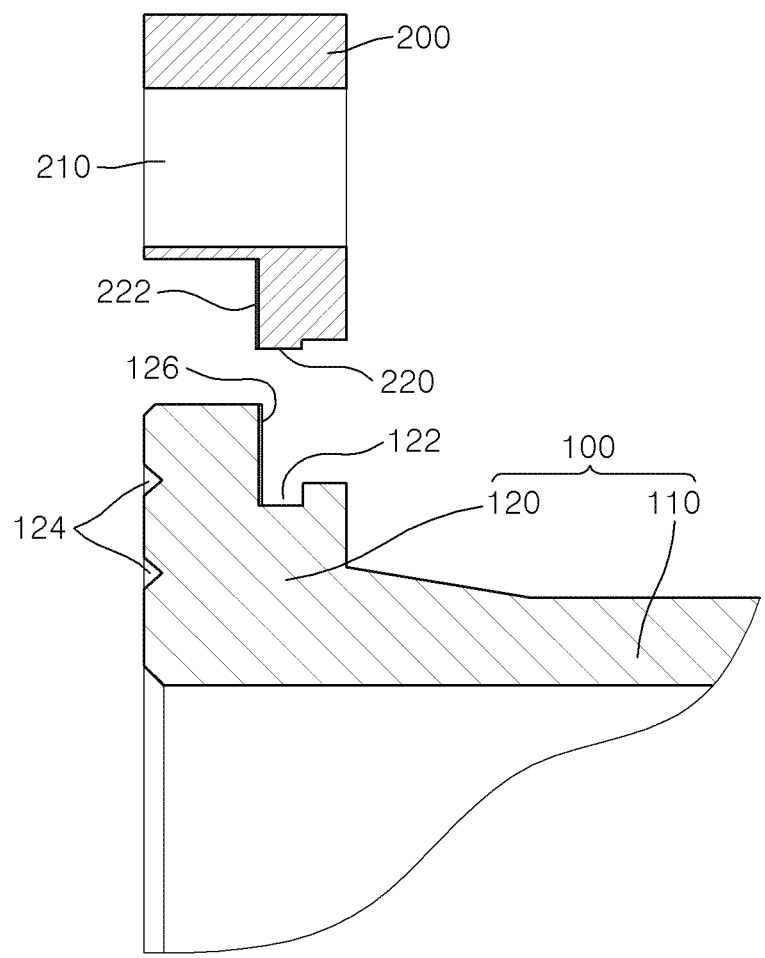

FIGS. 6 and 7 are, respectively, a perspective cross-sectional view and an exploded cross-sectional view of a second embodiment of the pipe connection device according to the present invention.

In the pipe connection device according to the present invention, the fastening force of the fastening unit 300 is transmitted to one surface of the slide groove 122 through the slide protrusion 220. If a contact area between the slide protrusion 220 and the slide groove 122 is set to be small, the fastening force of the fastening unit 300 is concentrated on a small area, which may increase the risk of the slide protrusion 220 or the slide groove 122 being deformed or damaged.

Therefore, in the pipe connection device according to the present invention, in order to allow the fastening force of the fastening unit 300 to be transmitted to the protruding end 120 through a larger area, as shown in FIGS. 6 and 7, it is preferable for the inner wall of the slide groove 122 close to one end of the hollow pipe 110 among the inner walls of the slide groove 122 to be formed to be higher than the inner wall thereof close to the other end of the hollow pipe 110.

When one inner wall of the slide groove 122 is formed to be high in this way, a large contact area may be secured between the slide protrusion 220 and the slide groove 122, which may greatly reduce the risk of the slide protrusion 220 or the slide groove 122 being deformed or damaged.

Figure 8:
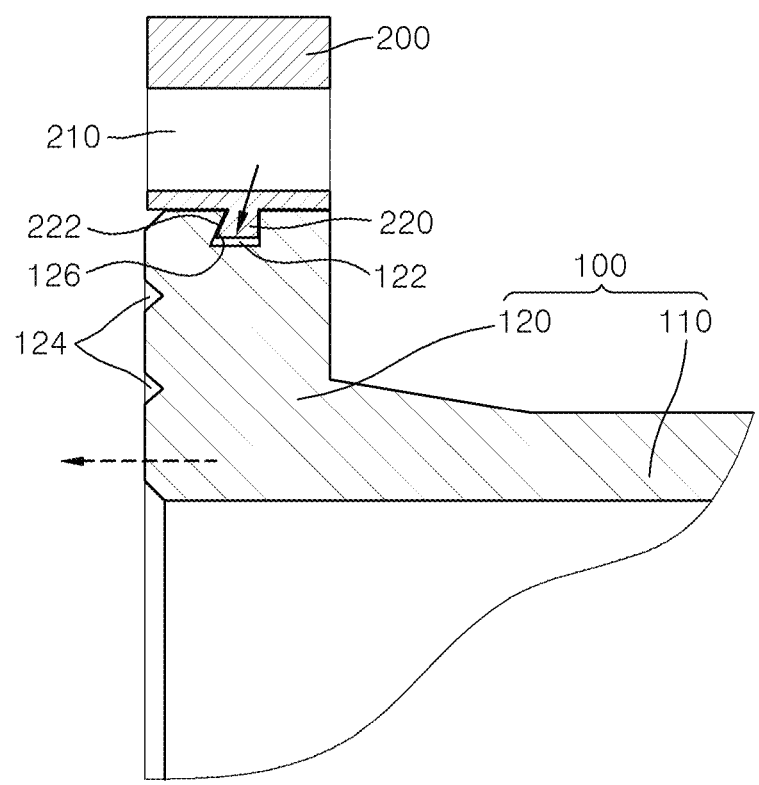
FIG. 8 is a cross-sectional view of a third embodiment of the pipe connection device according to the present invention.

FIG. 8 is a cross-sectional view of a third embodiment of the pipe connection device according to the present invention.

The ring flange 200 is configured to be axially rotatable in a state of being mounted so as to surround the protruding end 120. In this case, if the inner circumferential surface of the ring flange 200 is in close contact with the outer circumferential surface of the protruding end 120, that is, if a large frictional force is generated between the ring flange 200 and the protruding end 120, a large force is required to axially rotate the ring flange 200.

Therefore, in the pipe connection device according to the embodiment, it is preferable that the inner diameter of the ring flange 200 be formed to be slightly larger than the outer diameter of the protruding end 120. In this case, however, there is a risk of foreign substances being introduced into a gap between the inner circumferential surface of the ring flange 200 and the outer circumferential surface of the protruding end 120.

If dirt or other foreign matter is introduced into a gap between the inner circumferential surface of the ring flange 200 and the outer circumferential surface of the protruding end 120, the ring flange 200 may not rotate smoothly when it is intended to release the fastening unit 300 and rotate the ring flange 200 in order to re-align the ring flange 200.

Therefore, the ring flange 200 may be configured to be spaced apart from the outer circumferential surface of the protruding end 120 before the fastening unit 300 is fastened and to be brought into close contact with the outer circumferential surface of the protruding end 120 when the fastening unit 300 is fastened. That is, the inner wall of the slide groove 122 close to one end of the hollow pipe 110 among the inner walls of the slide groove 122 may be formed to be inclined toward one end of the hollow pipe 110 from the top of the slide groove 122 to the bottom surface thereof, and one side surface of the slide protrusion 220 may be formed to be inclined so as to be in contact with the inclined inner wall of the slide groove 122.

As described above with reference to FIG. 5, the pipe connection device according to the present invention is configured such that one surface of the protruding end 120 protrudes slightly beyond one surface of the ring flange 200. Thus, when two different protruding ends 120 are disposed in contact with each other, the ring flanges 200 mounted to the respective protruding ends 120 are spaced a predetermined distance from each other.

In this state, when the fastening unit 300 is fastened, the two ring flanges 200 are pushed to approach each other. In this case, as described in this embodiment, if one side surface of the slide protrusion 220 and one inner wall of the slide groove 122 are formed to be inclined, the ring flange 200 is brought into close contact with the outer circumferential surface of the protruding end 120 while being pushed forwardly (in the leftward direction in FIG. 8), as shown in FIG. 8. If the ring flange 200 is made of a synthetic resin having a certain level of ductility, the ring flange 200 may be more securely brought into close contact with the protruding end 120.

In this way, when the inner circumferential surface of the ring flange 200 is in close contact with the outer circumferential surface of the protruding end 120, there is no risk of dirt or other foreign matter being introduced into a gap between the ring flange 200 and the protruding end 120, and accordingly, maintenance work, e.g., release and reassembly of the ring flange 200, may be facilitated. In addition, because no foreign substances are introduced into a gap between the ring flange 200 and the protruding end 120, the risk of the ring flange 200 and the protruding end 120 being damaged may be reduced.

Figure 9:
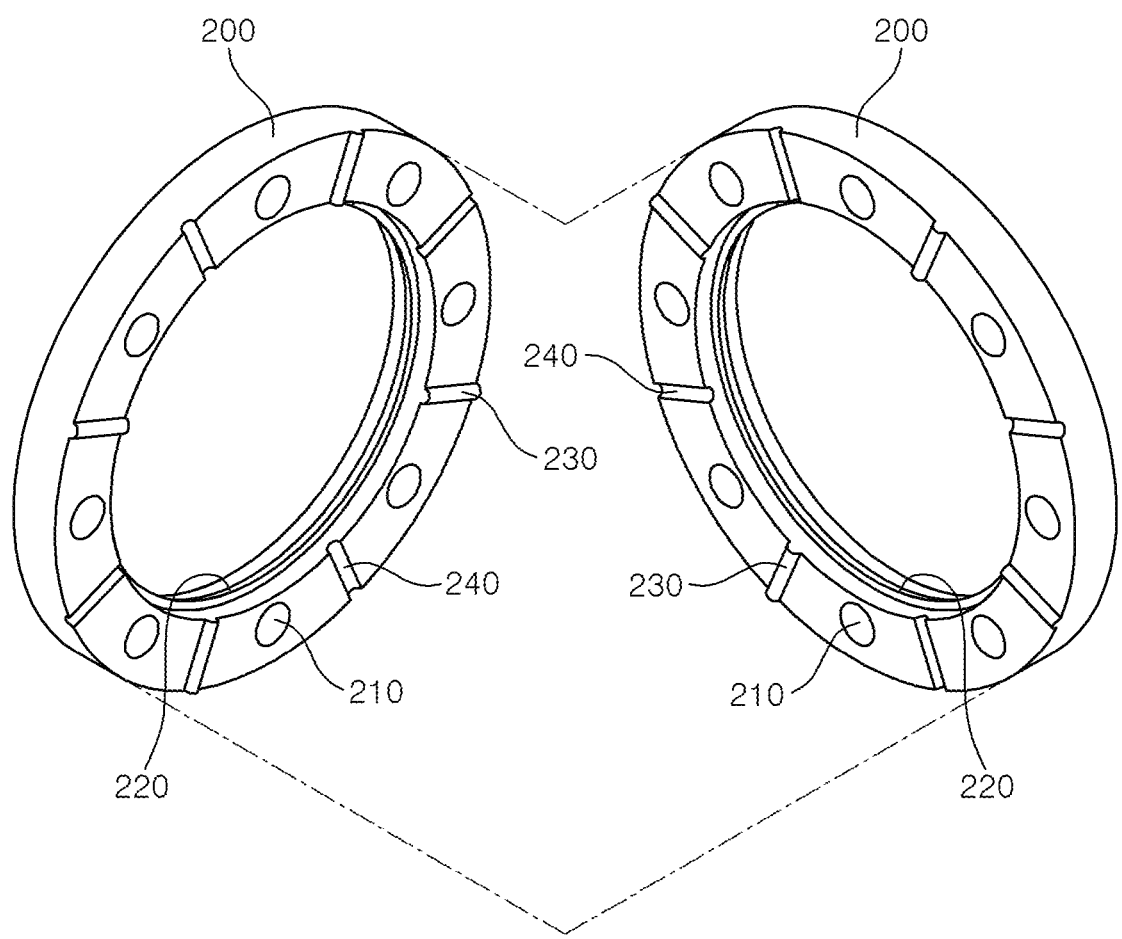
FIG. 9 is a perspective view of a ring flange included in a fourth embodiment of the pipe connection device according to the present invention.

FIG. 9 is a perspective view of a ring flange 200 included in a fourth embodiment of the pipe connection device according to the present invention.

When two pipes are connected to each other using the pipe connection device according to the present invention, the axial rotation angles of the two ring flanges 200 need to be adjusted so that the fastening holes 210 formed in the respective ring flanges 200 are aligned. However, when the ring flanges 200 are laid underground, there is a problem in that it is difficult for a worker to visually check the positions of the fastening holes 210.

In order to solve this problem, the pipe connection device according to the present invention may be configured to allow a worker to align the fastening holes 210 without the necessity to visually check the positions of the fastening holes 210.

For example, the plurality of fastening holes 210 may be arranged at regular intervals in the circumferential direction of the ring flange 200, and click protrusions 230 and click grooves 240 may be alternately formed on one surface of the ring flange 200 in such a manner that one of the click protrusions 230 or one of the click grooves 240 is located between two adjacent ones of the fastening holes 210. One of the click protrusions 230 or one of the click grooves 240 may be located exactly halfway between two adjacent ones of the fastening holes 210. Thus, when the click protrusions 230 of one of the ring flanges 200 are seated in the click grooves 240 in the other of the ring flanges 200, the fastening holes 210 formed in the respective ring flanges 200 are aligned.

In this case, the click protrusions 230 may be formed to protrude to a preset height or less, and the click grooves 240 may be formed to receive the click protrusions 230 therein. Thus, in the state in which two ring flanges 200 are stacked such that one surface of one ring flange and one surface of the other ring flange are in contact with each other, the worker may axially rotate any one of the ring flanges 200 until the click protrusions 230 are seated in the click grooves 240. When the click protrusions 230 are seated in the click grooves 240, the work may feel a clicking sensation, thereby recognizing alignment of the fastening holes 210 formed in the two ring flanges 200 and thus easily fastening the fastening unit 300.

In this case, the protruding height of the click protrusions 230 may be appropriately set depending on various conditions, for example, the size or material of the ring flange 200.

As is apparent from the above description, a pipe connection device according to the present invention may more easily and stably connect two pipes to each other. Further, because the pipe connection device does not require a separate stopper for preventing rotary movement of a rotary flange in the longitudinal direction of a pipe, the internal configuration thereof may be simplified. Furthermore, airtightness between two pipes may be greatly improved.

The effects achievable through the invention are not limited to the above-mentioned effects, and other effects not mentioned herein will be clearly understood by those skilled in the art from the above description.

Although preferred embodiments of the present invention have been illustrated and described in order to exemplify the principle of the present invention, the present invention is not limited to the specific embodiments. It will be understood that various modifications and changes can be made by those skilled in the art without departing from the spirit and scope of the invention as defined by the appended claims.

What is claimed is:

1. A pipe connection device comprising:
   an adapter comprising a hollow pipe and a ring-shaped protruding end extending in a diameter direction of the hollow pipe from one end of the hollow pipe in a longitudinal direction;
   a ring flange formed in a ring shape and mounted so as to surround an outer circumferential surface of the protruding end and to be axially rotatable about a central axis of the hollow pipe in the longitudinal direction but not to be movable over the hollow pipe in a fully assembled state; and
   a fastening unit configured to join the ring flange and a second ring flange of a second adapter having a second hollow pipe to each other in a stacked structure so that one end of the ring flange or the second ring flange of the hollow pipes in the longitudinal direction and one end of the other of the ring flange or the second ring flange of the hollow pipes in the longitudinal direction are forcibly secured to each other,
   wherein the protruding end comprises a slide groove formed in an outer circumferential surface thereof so as to extend in a circumferential direction of the protruding end,
   wherein the ring flange comprises a slide protrusion formed on an inner circumferential surface thereof so as to be inserted into the slide groove and to be slidable in a longitudinal direction of the slide groove, and
   wherein the pipe connection device further comprises:
   a groove reinforcing plate having higher strength and wear resistance than the protruding end and attached to an inner wall of the slide groove close to the one end of the hollow pipe among inner walls of the slide groove; and
   a protrusion reinforcing plate having higher strength and wear resistance than the slide protrusion and attached to an outer surface of the slide protrusion corresponding to the groove reinforcing plate among outer surfaces of the slide protrusion.

2. The pipe connection device according to claim 1, wherein the protruding end comprises at least one seating groove formed in a circular shape in one surface thereof so as to surround an inner space in the hollow pipe, and
   wherein the pipe connection device further comprises an O-ring seated in the seating groove.

3. The pipe connection device according to claim 1, wherein an end surface of the slide protrusion is formed to be inclined in a direction intersecting a bottom surface of the slide groove so that an end of the slide protrusion is in line contact with the bottom surface of the slide groove.

4. The pipe connection device according to claim 1, wherein the inner wall of the slide groove close to the one end of the hollow pipe among inner walls of the slide groove is formed to be higher than an inner wall thereof close to another end of the hollow pipe.

5. The pipe connection device according to claim 1, wherein the inner wall of the slide groove close to the one end of the hollow pipe among inner walls of the slide groove is formed to be inclined toward the one end of the hollow pipe from a top of the slide groove to a bottom surface of the slide groove, and
   wherein one side surface of the slide protrusion is formed to be inclined so as to be in contact with the inclined inner wall of the slide groove.

6. A pipe connection device comprising:
   an adapter comprising a hollow pipe and a ring-shaped protruding end extending in a diameter direction of the hollow pipe from one end of the hollow pipe in a longitudinal direction;
   a ring flange formed in a ring shape and mounted so as to surround an outer circumferential surface of the protruding end and to be axially rotatable about a central axis of the hollow pipe in the longitudinal direction but not to be movable over the hollow pipe in a fully assembled state; and a fastening unit configured to join the ring flange and a second ring flange of a second adapter having a second hollow pipe to each other in a stacked structure so that one end of the ring flange or the second ring flange of the hollow pipes in the longitudinal direction and one end of the other of the ring flange or the second ring flange of the hollow pipes in the longitudinal direction are forcibly secured to each other, wherein the ring flange comprises a plurality of fastening holes formed therein, wherein the fastening unit comprises:

a fastening bolt inserted through one of the plurality of fastening holes in the ring flange and a corresponding fastening hole in the second ring flange; and a fastening nut configured to secure the fastening bolt to the ring flange, wherein the plurality of fastening holes is arranged at regular intervals in a circumferential direction of the ring flange, wherein the ring flange further comprises:

click protrusions protruding from one surface of the ring flange to a preset height or less; and click grooves formed in the one surface of the ring flange so as to receive click protrusions of the second ring flange, and wherein the click protrusions and the click grooves are alternately arranged such that one of the click protrusions or one of the click grooves is located between two adjacent ones of the plurality of fastening holes.

* * * * *